United States Patent [19]

Mizoguchi et al.

[11] Patent Number: 4,589,827

[45] Date of Patent: May 20, 1986

[54] ELECTRIC MOTOR FAN

[75] Inventors: Hiroaki Mizoguchi, Ibaraki; Toshio Hayashibara, Katsuta; Tadashi Shitara, Ibaraki; Sigeyuki Katano, Ibaraki; Hideo Kume, Ibaraki, all of Japan

[73] Assignee: Hitachi, Ltd., Tokyo, Japan

[21] Appl. No.: 617,100

[22] Filed: Jun. 4, 1984

[30] Foreign Application Priority Data

Jun. 3, 1983 [JP] Japan ................. 58-100062

[51] Int. Cl.⁴ ............................. F04B 17/00
[52] U.S. Cl. ................. 417/423 R; 361/384; 415/219 B
[58] Field of Search ........... 417/32, 366, 423 R, 417/423 A, 424; 415/219 B, 206; 361/383, 384, 386

[56] References Cited

U.S. PATENT DOCUMENTS

| 4,103,737 | 8/1978 | Perkins | 361/384 X |
| 4,265,597 | 5/1981 | Payne et al. | 417/32 |
| 4,365,288 | 12/1982 | Robe et al. | 361/384 X |

FOREIGN PATENT DOCUMENTS

| 116712 | 9/1979 | Japan | 417/32 |
| 125383 | 9/1980 | Japan | 417/32 |
| 239595 | 7/1969 | U.S.S.R. | 417/32 |

Primary Examiner—Edward K. Look
Attorney, Agent, or Firm—Antonelli, Terry & Wands

[57] ABSTRACT

An electric motor fan comprises a fan driven by a motor, a case with the fan mounted therein and including a scroll providing an air outlet port of the fan, and a control unit including an output transistor for controlling the drive of the motor. The control unit includes a heat radiation device mounted in the scroll for radiating the heat generated by the transistor. At least a part of the heat radiation device is formed as a radiation fin having an internal surface in the same plane as the internal wall surface of the scroll.

8 Claims, 12 Drawing Figures

4,589,827

ELECTRIC MOTOR FAN

BACKGROUND OF THE INVENTION

The present invention relates to an electric motor fan, and more particularly, to an electric motor fan in which and output transistor of a control unit for controlling the operation of a fan drive motor is mounted in a scroll to cool the fan with the air supplied thereby.

DESCRIPTION OF THE PRIOR ART

In, for example, Japanese Patent Laid Open Application No. 116712/79, an electric motor fan of this type is proposed for use in cooling passenger compartments of an automobile, with a small sized motor speed control unit is assembled in of the fan including a power transistor and an integrated circuit (IC) device mounted on the fan so that the transistor is cooled by use of the air supplied by the fan.

As shown in FIG. 1, a fan 1 is coupled directly to a motor 2 secured to a plastic lower case 3. An upper plastic case 4 has fixed at the central part thereof an iron plate bellmouth 5 forming an inlet port of the fan suction air. The upper case 4 is removably mounted on appropriate means (not shown) on the lower case 3 in such a manner as to make up a scroll casing S providing an outlet port of the fan discharge air in cooperation with the lower case 3. The fan is positioned on the scroll casing S. The upper case 4 has integrated therewith an external air inlet 6 and an internal air inlet 7, and also has an internal-external air switching damper 8 mounted thereon. The motor 2 includes a speed control unit 9, which has a mounting plate 40 and is mounted at a point near the outlet 31 of the scroll casing S with screws 41, 41' as shown in FIGS. 2 and 3. The speed control unti 9 includes a transistor $T_1$, and radiation fins 91 and 91' for reducing the heat generation of the transistor are mounted in protrusion in the scroll S. Since the transistor $T_1$ has a considerable heat generation, considerably large radiation fins must be provided to keep the temperature of the transistor $T_1$ below the tolerable limit such as 140° to 150° C. The resulting ventilation resistance of the radiation fins 91 and 91' extremely reduces the performance of the blower.

SUMMARY OF THE INVENTION

The object of the present invention is to provide an electric motor fan of the above-mentioned type of which the ventilation resistance is reduced by avoiding the above-mentioned disadvantages.

According to the present invention, there is provided an electric motor fan comprising a scroll casing, a fan directly coupled to a motor and mounted in the scroll casing, a control unit including an output transistor for controlling the driving of the motor, and radiation means mounted on the transistor arranged in the scroll for cooling the transistor, in which at least part of the radiation means is formed of radiation fins in a shape substantially flush with the interior wall surface of the scroll thereby to reduce the part of the radiation fins protruding from the wall interior.

DESCRIPTION OF THE PREFERRED EMBODIMENTS

Figure 4:
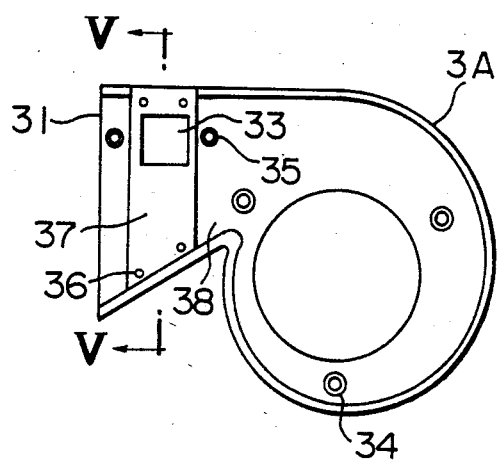
FIG. 4 is a front view of the lower case of an electric motor fan according to the present invention.
Figure 5:
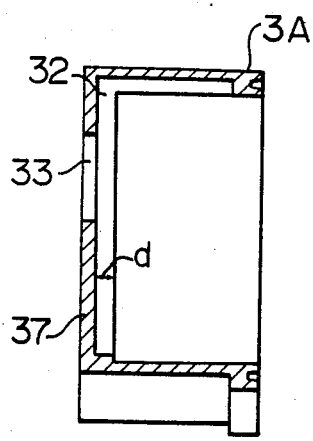
FIG. 5 is a sectional view taken in line V—V in FIG. 4.
Figure 6:
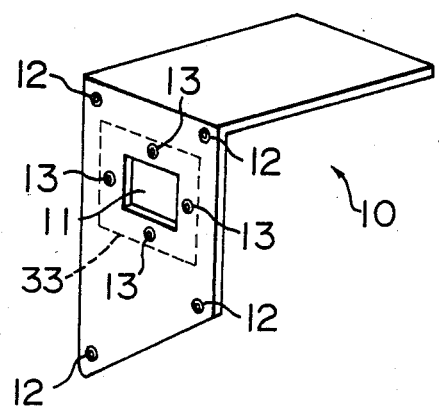
FIG. 6 is a perspective view showing an L-shaped radiation fin.
Figure 7A:
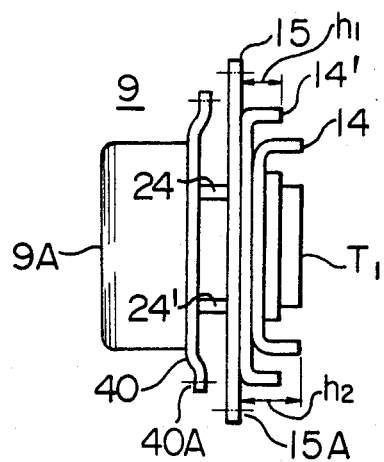
FIGS. 7A and 7B are side views of a control unit including a control section and a transistor.

An embodiment of the present invention will be explained with reference to the drawings. As shown in FIGS. 4 and 5, a part 37 of the lower case 3A near an outlet of a side wall 38 protrudes outward and forms a recess 32 in the lower case 3A, with the recess 32 forming a space for accomodating radiation fins of a transistor $T_1$ described later, and having a depth d slightly greater than a thickness of the radiation fin. An open 33 is provided for mounting the control unit 9A, with a nut 34 being provided for mounting the motor, and a nut 35 for mounting the control unit 9. These nuts 34, 35 are integrally embedded in the lower case 3A when the lower case 3A is molded with resin. A hole 36 is provided for accommodating the screw for mounting the radiation fins. FIG. 6 shows a radiation fin 10 which is substantially L-shaped and is provided with an opening 11 and taps 12, 13. The dotted line in FIG. 6 shows the position of the opening 33 of the lower case 3A with the recess 32 in which the radiation fin 10 is to be mounted. FIG. 7A shows the control unit 9 including a control section 9A and an output transistor $T_1$. The transistor $T_1$ has mounted thereon channel-shaped radiation fins 14, 15' and a tabular radiation fin 15. The control section 9A has mounted thereon an elongate strip of a mounting plate 40, which are formed with holes 40A positionally corresponding to the nuts 35 of the lower case, so that the control unit 9 may be secured to the lower case by fastening screws (not shown) on the nuts 35 through the holes 40A. Electrodes 24, 24' of the output transistor which are electrically connected to the control circuit provided in the control section 9A.

Figure 1:
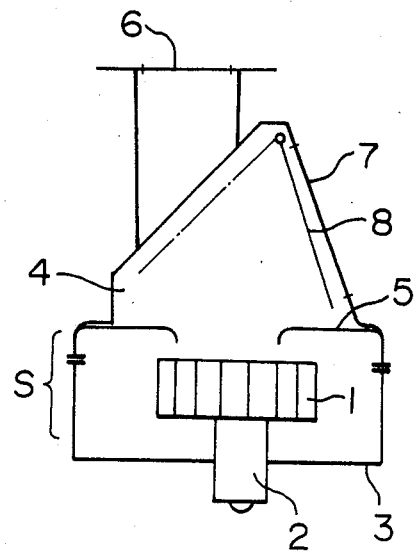
FIGS. 1 and 2 are schematic views of a conventional electric motor fan used for cooling the automobile compartments.
Figure 2:
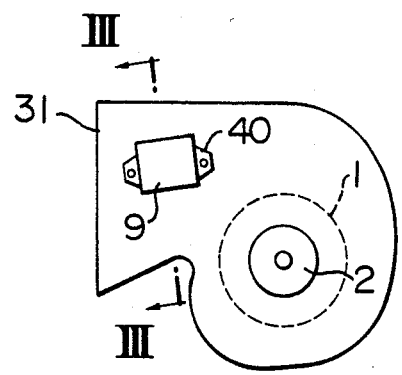
Figure 3:
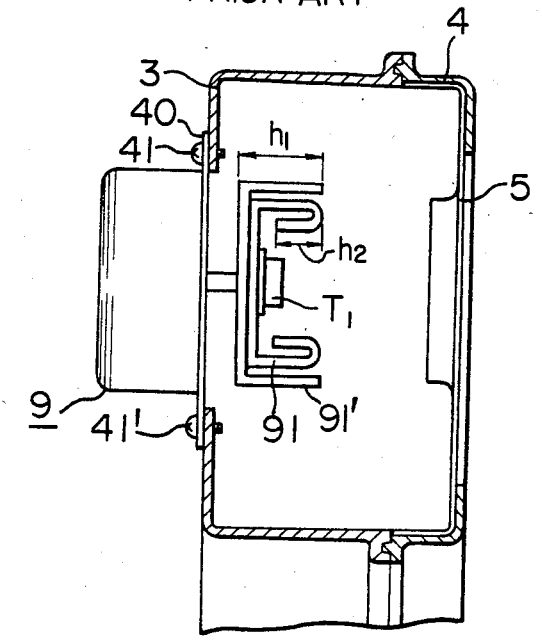
FIG. 3 is a sectional view taken in line III—III in FIG. 2.
Figure 8:
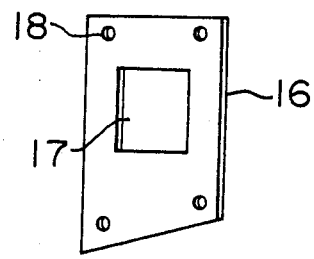
FIG. 8 is a diagram showing a shape of a packing.
Figure 9:
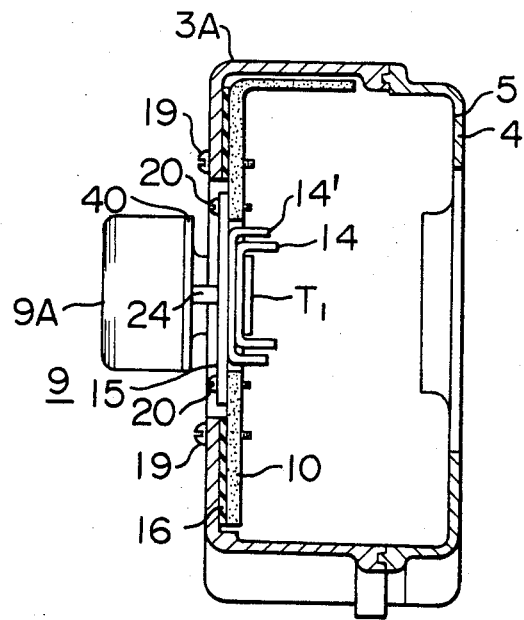
FIG. 9 is a sectional view similar to FIG. 5 showing various parts mounted on the lower case.
Figure 11:
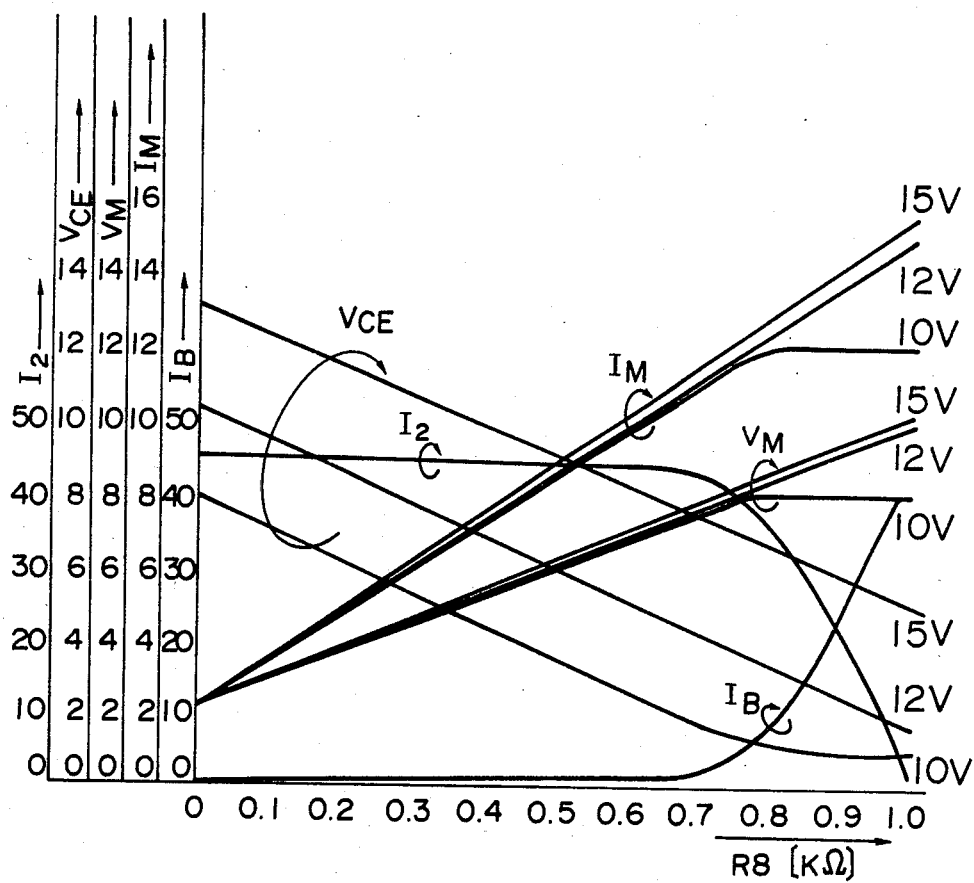
FIG. 11 is a diagram showing the control characteristics of the control unit shown in FIG. 10.

The channel-shaped radiation fins 14, 14' made of a thermally conductive material such as aluminum are simplified in shape as compared which the radiation fins 91 and 91' of the transistor of the conventional apparatus and the heights of the legs of the fins 14 and 14' are shorter than the heights of the legs of the fins 91 and 91'. For example, the fins 91 and 91' of the conventional apparatus with a transistor having a current capacity as shown in FIG. 11 have a heights $h_1$ of about 30 mm and the inner fin 91 additionally have a folded portion having a length $h_2$ of about 20 mm as shown in FIG. 3. On the other hand, in an apparatus of the present invention with a transistor of the same current capacity, it is not required to provide the inner fin 14 with any folded portion, as shown in FIG. 7A, and the heights of the fins 14 and 14' may be reduced to about 22 mm and 10 mm, respectively. The tabular radiation fin 15 has holes 15A at the parts thereof corresponding to the taps 13 of the L-shaped radiation fin 10. FIG. 8 shows a packing 16 made of a heat insulative material such as asbestos, including an opening 17 corresponding to the opening 33 of the lower case 3A and holes 18 corresponding to the taps 12 of the L-shaped radiation fins. Specifically, with the L-shaped radiation fin 10 inserted into the recess 32 of the lower case 3A, the control unit 9, the lower case 3A, the packing 16 and the radiation fin 10 are secured with the screws 19 by use of the holes 36 of the lower case 3A, the holes 18 of the packing 16 and the taps 12 of the radiation fin 10. The tabular radiation fin 15 of the transistor, on the other hand, is secured to the L-shaped radiation fin 10 by use of the taps 13 and the opening 17 of the packing 16. A part of the L-shaped radiation fin 10 is fixed through the packing 16, while the other part thereof forms a gap with the wall surface of the recess 33 on the interior of the lower case 3A. The inner surface of the radiation fin 10 is formed in the same plane as the interior wall of the scroll S. Both the electrodes 24 and 24' are shown in FIG. 7A, whereas only the electrode 24 is shown but the other electrode 24' is invisible in FIG. 9 showing a position turned by an angle of 90 degrees from FIG. 7A.

Figure 7B:
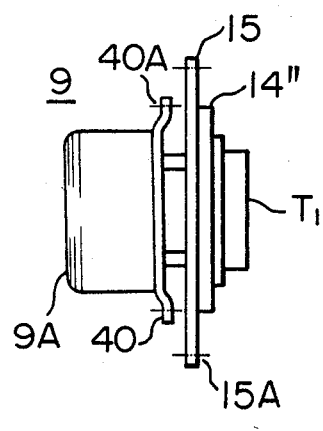

The construction of the embodiment of FIG. 7B is the same as that of the embodiment of FIG. 7A except that the channel-shaped radiation fins 14, 14' of FIG. 7A are replaced with a tabular radiation fin 14" in FIG. 7B. The tabular radiation fin 14' is lower in radiation effect than the channel-shaped radiation fins 14, 14', and therefore the L-shaped radiation fin 10 is required to be increased in size considerably as compared with the L-shaped fin used in the apparatus of FIG. 7A.

Figure 10:
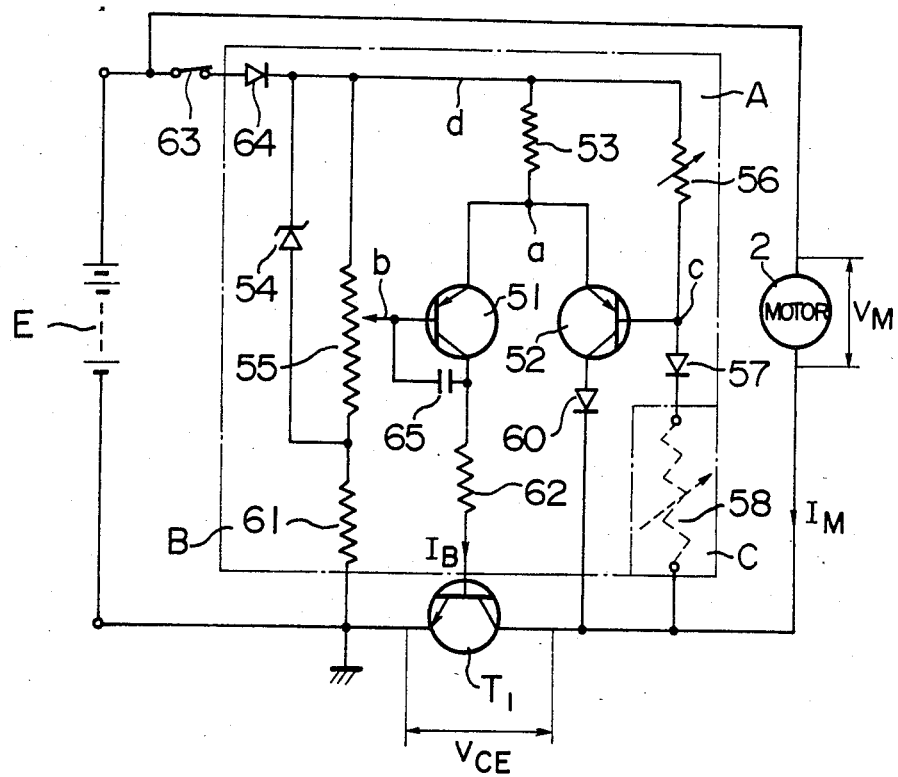
FIG. 10 is a circuit diagram showing an example of the control unit.

As shown in FIG. 10, the motor 2 is connected in series to a DC power supply through the emitter-collector circuit of the transistor $T_1$, thereby making up a closed loop.

Numerals 51 and 52 designate PNP transistors of a differential amplifier, the emitters of which are connected through a common resistor 53 to a line d. The collector of the transistor 51 is connected to the base of the output transistor $T_1$ through a current-limiting resistor 62. The collector of the transistor 52 is connected to the collector of the output transistor $T_1$ through a reverse flow-blocking diode 10. The bases of the transistors 51 and 52 form input terminals of the differential amplifier. A potentiometer 55 and a fixed resistor 61 are inserted in series between the power terminals, thereby forming a dividing circuit for the source voltage. A zener diode 54 connected in parallel to the potentiometer 55 maintains the voltage across the potentiometer 55 constant and functions so as to apply a constant voltage to the base of the transistor 51, that is, an input terminal of the differential amplifier connected to the sliding terminal b of the potentiometer 55.

A series circuit including a semi-fixed resistor 56, a diode 57 and a variable resistor 58 form a dividing circuit for dividing the terminal voltage of the motor in such a manner as to apply the variations of the terminal voltage of the motor to the base of the transistor 52 connected to the junction point c of the semi-fixed resistor 56 and the diode 57, that is, the other input terminal of the differential amplifier. A variable resistor 58, illustrated in phantom line, is regulated by an external regulation means (not shown) to set a base potential of the transistor 52. The circuit further includes an operating switch 63 and a reverse flow blocking diode 64. The motor 2 is directly connected to the power supply, the control circuit A is connected to the power supply through the switch 63 and the reverse flow blocking diode 64.

The control circuit A includes a differential amplifier section B wired on a single substrate and a base potential setting means C constructed separately from the differential amplifier section B. The differential amplifier B, in combination with the output transistor, is fixed to face the interior of the fan scroll, so that both the transistors 51 and 52 are actuated under the same temperature conditions to reduce the effect of heat on the differential amplifier. Both the transistors 51 and 52 have the same rating and the same characteristics.

The variable resistor 58 is arranged on an air-conditioning control box mounted on the instrument panel in the passenger compartment, and is adjustable by an external adjusting mechanism such as a manual lever or a power servo system.

For this purpose, an end of the variable resistor 58 is connected by a lead wire to the junction point of the collector of the output transistor $T_1$ and motor 2, and the other end thereof to the cathode of the diode 57.

Since the junction point of the collector of the output transistor $T_1$ and the motor 2 is used for connection of an end of the variable resistor 58, only a single terminal exclusive to the variable resistor 58 is provided on the circuit board.

Diodes 57 and 60 block the flow of the current generated by the inertia of the motor 2 upon turning off the switch 63, which otherwise might flow reversely through the base-emitter and collector-emitter circuits of the transistor 52, through the point a to the emitter-base circuit of the transistor 51, which might cause the emitter-collector current of the transistor 51 to actuate the output transistor. A capacitor 65 erases the noises and prevents the noises carried on the current supply from being amplified and changing the output of the output transistor in pulse form.

The value of the resistor 62 is minimized as compared with the value of the resistor 53 thereby to reduce drifts. The source voltage is generally 12 V which is usual for ordinary motor vehicle batteries, with the voltage being divided to produce a reference power supply of 6 V through a zener diode 54.

The variable resistor 58 takes a minimum value of zero and a maximum value of 1 kΩ. With the value of the variable resistor set to this minimum value, the potentiometer 55 is adjusted to apply a voltage of 2 V to the base of the transistor 51, thus minimizing the current branching into the transistor 51. In this state, the resistor 58 is fixed.

By contrast, the semi-fixed resistor 56 is adjusted in such a manner that the voltage of 12 V is applied to the base of the transistor 52 at the maximum value of the variable resistor 58, and the resistor 56 is thus fixed to maximize the current flowing to the transistor 1.

FIG. 11 shows changes of the base current $I_B$ of the output transistor $T_1$, the change of the voltage $V_{CE}$ between collector and emitter of the transistor $T_1$, the change of the terminal voltage $V_M$ of the motor, the change of the current flowing in the motor (the collector current of the transistor) $I_M$, and the change of the collector current $I_2$ of the transistor 52, with the value $R_{58}$ of the variable resistor 58 being changed from zero to 1 kΩ proportionately. The parameters of 15 V, 12 V and 10 V designate source voltages respectively.

By the adjustment mentioned above, when a source voltage of 12 V is involved, the proportional change of the variable resistor 58 causes a change of the collector current of the transistor 52 in the manner shown by the curve $I_2$. The base current of the output transistor $T_1$ thus changes along the curve $I_B$, with the result that the collector current amplified by the $I_B$–$I_C$ characteristic of the output transistor (motor current $I_M$) changes substantially proportionately from 2 A to about 15 A in the manner shown by the curve $I_M$ (12 V).

In view of the fact that the voltage drop between the emitter and collector of the output transistor changes proportionally from about 10 V to about 2 V along the negative gradient of the curve $V_{CE}$ (12 V) with the change of the current $I_M$, the terminal voltage $V_M$ of the motor undergoes a proportional change along the positive gradient of the curve $V_M$ in exactly opposite manner to the voltage drop $V_{CE}$.

The rotational speed of the motor is proportional to the induced electromotive force of the motor (the terminal voltage of the motor less the voltage drop due to the winding resistance), and therefore, if the apparatus is constructed as in the embodiment described above, the rotational speed of the motor can be changed continuously and proportionally by propotional change of the value of the variable resistor 58.

The transistor $T_1$ is heated by the current flowing therein, and when the temperature thereof reaches a hundred and several tens of degrees in centrigrade, the transistor $T_1$ stops producing the predetermined characteristics. Therefore, the transistor $T_1$ is cooled by the wind of the fan 1 fixed on the motor 2 through the radiation fins 10, 14, 14' and 15.

The above-mentioned construction produces the following advantages:

(1) The L-shaped radiation fin 10 is constructed flush with the internal peripheral surface of the wall of the scroll S, and the part of the radiation means protruded in the air path is reduced, thus reducing the air flow resistance of the motor fan. As a consequence, the performance of the electric motor fan is improved.

The capacity of the motor 2 can thus be reduced to lower the cost. Further, the same amount of wind as in the conventional apparatus is secured by a lower rotational speed, thereby greatly contributing to reduced noise of the motor fan.

(2) The wind from the fan 1 flows through the gap formed between the internal wall surface of the recess 33 of the lower case 3A and a part of the L-shaped radiation fin 10, thus improving the radiation effect.

(3) When a packing 16 is inserted between the lower case 3A and the L-shaped radiation fin 10, the heat of the radiation fin 10 does not transmit to the lower case 3A and therefore the lower case 3A is not deformed, the lower case 3A being generally molded with synthetic resin (with polypropylene for the most part).

If the radiation fin 10 is directly mounted on the lower case 3A of synthetic resin, on the other hand, the heat of the radiation fin 10 would be transmitted directly to the lower case 3A. Especially in the case of an automobile in which the motor fan is always subjected to vibrations, a damage or a deformation would occur due to the temperature rising only at the part of the lower case 3A in contact with the radiation fin. In the case where the scroll is iron, fastening of the radiation fin directly to the case will increase the scroll temperature and may cause a burn on a person who may touch it. Such an inconvenience is avoided by the packing 16 interposed according to the present embodiment.

The aforementioned embodiments of the present invention are mostly applied to an electric motor fan of an automotive air-conditioning system including an internal air inlet 7 and an external air inlet 6 integrally formed on the upper case 4. Nevertheless, the present invention is applicable also to other electric motor fans.

We claim:

1. An electric motor fan comprising a fan driven by a motor, a case internally mounting the fan and having a scroll providing an air path for guiding the air supplied by said fan, and a control unit including an output transistor assembly including a transistor means for controlling the drive of said motor, heat radiation means connected to said transistor and mounted to said scroll at its portion substantially apart from said fan for radiating the heat generated by said transistor, said heat radiation means comprising at least one heat radiation fin mounted on the internal wall surface of said scroll portion within said air path so as to be in substantially the same plane as the internal wall surface of said scroll portion, said heat radiation fin is mounted on the internal wall surface of said scroll portion through a packing made of a heat insulating material.

2. An electric motor fan according to claim 1, wherein said first heat radiation fan is made in the shape of L.

3. An electric motor fan comprising a fan driven by a motor, a case internally mounting the fan and having a scroll providing an air path for guiding the air supplied by said fan, and a control unit including an output transistor assembly including a transistor means for controlling the drive of said motor, heat radiation means connected to said transistor and mounted to said scroll at its portion substantially apart from said fan for radiating the heat generated by said transistor, said heat radiation means comprising at least one heat radiation fin mounted on the internal wall of said scroll portion within said air path so as to be in substantially the same plane as the internal wall surface of said scroll portion, said heat radiation means including said at least one heat radiation fin with the internal surface thereof substantially in the same plane as the internal wall surface of said scroll portion, and a second radiation fin having a part protruded into said air path from the internal wall surface of said scroll, said first heat radiation fin is mounted on the internal wall surface of said scroll portion through a heat insulating packing.

4. An electric motor fan according to claim 3, wherein said radiation fin making up said part of said radiation means is made in the shape of L.

5. An electric motor fan according to claim 3, wherein said first heat radiation fin has a substantially L-shape.

6. An electric motor fan comprising a fan driven by a motor, a case internally mounting the fan and having a scroll providing an air path for guiding the air supplied by said fan, and a control unit including an output transistor for controlling the drive of said motor, said transistor includes heat radiation means arranged in said scroll for radiating the heat generated thereby, and a heat radiation fin forming at least a part of said radiation means mounted on the internal wall surface of the scroll in substantially the same plane as the internal wall surface of the scroll, said heat radiation fin has a substantially L-shaped configuration, a part of said L-shaped radiation fin is mounted on the internal wall surface of said scroll through a packing made of a heat insulating material, and the other part thereof forms a gap with the internal wall surface of said scroll.

7. An electric motor fan comprising a fan driven by a motor, a case internally mounting the fan and having a scroll providing an air path for guiding the air supplied by said fan, and a control unit including an output transistor assembly including a transistor means for controlling the drive of said motor, heat radiation means connected to said transistor and mounted to said scroll at its portion substantially apart from said fan for radiating the heat generated by said transistor, said heat radiation means comprising at least one heat radiation fin mounted on the internal wall surface of said scroll portion within said air path so as to be in substantially the same plane as the internal wall surface of said scroll portion, a part of said heat radiation fin is mounted on the internal wall surface of said scroll portion through a packing made of a heat insulating material, and another part of the fin forms a gap with the internal wall surface of said scroll portion.

8. An electric motor fan according to claim 7, wherein said first heat radiation fin has a substantially L-shape.

* * * * *